(No Model.)
V. M. MOORE.
VISE.
No. 326,138. Patented Sept. 15, 1885.
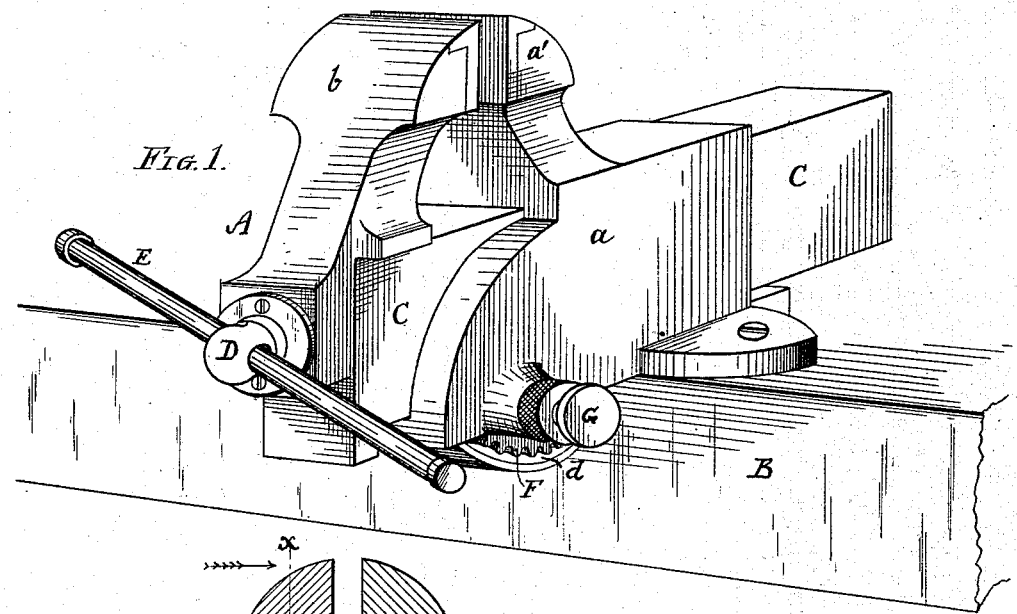
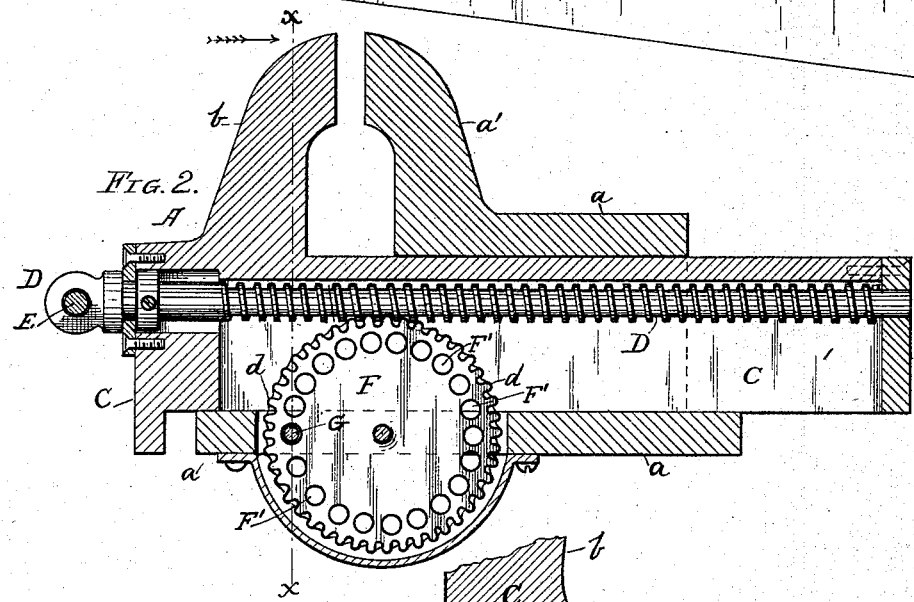
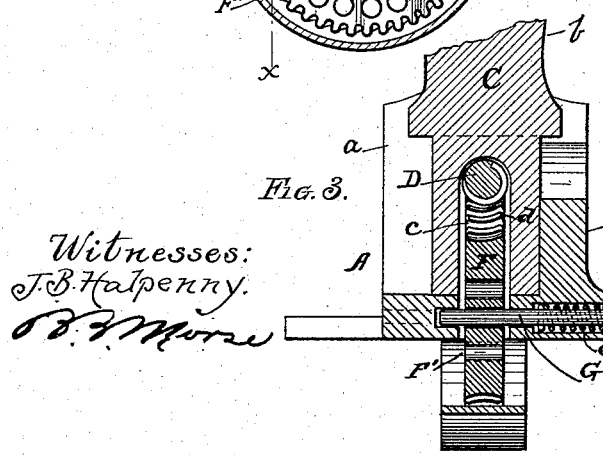
Witnesses:
J. B. Halpenny.
Inventor:
V. Mumford Moore
By F. F. Warner
his atty.

UNITED STATES PATENT OFFICE.

V. MUMFORD MOORE, OF CHICAGO, ILLINOIS.

VISE.

SPECIFICATION forming part of Letters Patent No. 326,138, dated September 15, 1885.

Application filed August 6, 1885. (No model.)

*To all whom it may concern:*

Be it known that I, V. MUMFORD MOORE, a citizen of the United States of America, residing at Chicago, in the county of Cook and State of Illinois, have invented certain new and useful Improvements in Vises, of which the following, in connection with the accompanying drawings, is a specification.

In the drawings, Figure 1 is a perspective representation of a vise embodying my improvements. Fig. 2 is a vertical central longitudinal section of the same, and Fig. 3 is a section in the plane of the line $x$ $x$ of Fig. 1.

Like letters of reference indicate like parts.

The purpose of my invention is to provide improved means for regulating the distance between the jaws of the vise. Heretofore means have been furnished whereby one of the jaws could be moved quickly to or from the other, and then set or clamped upon the article to be held. It frequently occurs that the article to be arranged in the vise is of such dimensions that the movable jaw must be moved a considerable distance. This movement, when accomplished by means of a screw in the usual manner, is necessarily slow. To facilitate work one jaw has been made capable of being moved independently of a screw, when a considerable movement was necessary, and of being afterward clamped by means of a screw or lever upon the article to be worked upon. To facilitate the work in this manner is not therefore new with me; but my invention consists in certain novel means for accomplishing the result desired, and which I will now describe.

A represents a vise, which, with the exceptions hereinafter set forth, belongs to a class well known to those familiar with the art. B is a bench or table to which the vise is applied. The fixed block or part $a$ has upon it the stationary jaw $a'$. C is a slide or sliding block carrying the movable or adjustable jaw $b$. The slide C is movable in the part $a$, and D is a screw in the said slide. E is the lever for working the screw D.

The vise, as thus far described, is an old and well-known structure. The screw D has heretofore engaged a fixed screw-threaded part, and as the screw was turned the jaw $b$ would be moved to or from the jaw $a'$, according to the direction in which the lever E was moved.

My invention consists, chiefly, in making the part engaged by the screw movable, and in providing means for making said part temporarily fixed or immovable, as will hereinafter more fully appear.

F is a wheel journaled in the block $a$. The perimeter of this wheel is by preference slightly grooved to correspond to the cylindrical form of the screw D, as indicated at $c$, Fig. 3, the said groove being continuous or extending entirely around the wheel. Extending in a somewhat oblique direction across the perimeter of the wheel are cogs $d$ $d$. These cogs are cut obliquely to receive the thread of the screw D, the said screw and the said wheel being in engagement, as is clearly indicated in Fig. 2. F' F' are holes passing through the wheel F.

G is a bolt entering the block $a$. The outer end of this bolt is arranged, as shown, to permit the position of the bolt to be changed with facility by the operator. The inner end of the said bolt is arranged to enter the holes F' F'. I deem it expedient, but not essential, to employ a spring, $e$, for the purpose of holding the bolt yieldingly in place.

It will be perceived from the foregoing description, and on reference to the drawings, that the jaw $b$ may be set a greater or less distance from the jaw $a'$ in the usual manner, when the bolt G enters or extends through one of the holes F' F'. It will also be perceived that the jaw $b$ may also be moved rapidly or quickly to and from the jaw $a'$ by drawing the said bolt out of engagement with the said wheel F. When this engagement does not exist, the said wheel will be rotated by drawing the slide C in and out, and the screw D will then travel as a rack upon the said wheel. In other words, the jaw $b$ may be moved freely when the engagement referred to does not exist; but by allowing the bolt to enter one of the holes F' the said jaw may be adjusted further by means of the adjusting-screw. By these means the movable jaw may, without the instrumentality of the screw, be set up against the article to be clamped, and the screw may afterward be employed, as usual, to tighten the jaws upon the article between them.

The means of locking the wheel F temporarily may be varied without a substantial departure from the scope of the principal part of my invention.

Having thus described my invention, what

I claim as new, and desire to secure by Letters Patent, is—

1. The combination, with the adjusting-screw of a vise, of a cogged wheel adapted and arranged for engagement with the said screw, and a locker for temporarily preventing the rotation of the said wheel.

2. The combination, in a vise, of the screw D, the wheel F, and bolt or locker G, substantially as and for the purpose specified.

3. The combination, in a vise, of the screw D, wheel F, having holes F' F' therein, and yielding bolt or locker G, substantially as and for the purposes specified.

In testimony that I claim the foregoing as my own I hereunto affix my signature in presence of two witnesses.

V. MUMFORD MOORE.

Witnesses:
F. F. WARNER,
ADDIE HUEZAGH.